United States Patent [19]

Diepholder

[11] Patent Number: 4,724,648

[45] Date of Patent: Feb. 16, 1988

[54] DEFORMABLE SEAL ELEMENT TO SEAL THE GAP BETWEEN AN APERTURE IN A BUILDING AND A VEHICLE DRIVEN UP TO THE LATTER

[76] Inventor: Richard Diepholder, Moerikestr. 3, D-4937 Lage, Fed. Rep. of Germany

[21] Appl. No.: 898,183

[22] Filed: Aug. 19, 1986

[30] Foreign Application Priority Data

Jan. 15, 1986 [DE] Fed. Rep. of Germany ....... 8600773

[51] Int. Cl.4 ............................................. E04H 14/00
[52] U.S. Cl. ............................................... 52/173 DS
[58] Field of Search .................... 52/173 DS; 14/71.5; 49/475, 504

[56] References Cited

U.S. PATENT DOCUMENTS

| 3,461,627 | 8/1969 | Conger | 52/173 DS |
|---|---|---|---|
| 3,500,599 | 3/1970 | Sciolino | 52/173 DS |
| 3,638,667 | 2/1972 | Frommelt et al. | 52/173 DS |
| 3,772,839 | 11/1973 | Timbers | 52/173 DS |
| 3,826,049 | 7/1974 | Frommelt et al. | 52/173 DS |
| 4,003,170 | 1/1977 | Mellyn | 52/173 DS |
| 4,015,380 | 4/1977 | Chalfant | 52/173 DS |
| 4,381,631 | 5/1983 | Frommelt | 52/173 DS |
| 4,494,341 | 1/1985 | Schwab | 52/173 DS |
| 4,516,366 | 5/1985 | Alten | 52/173 DS |

FOREIGN PATENT DOCUMENTS 2428989  1/1976  Fed. Rep. of Germany ... 52/173 DS

Primary Examiner—William F. Pate, III
Assistant Examiner—Michael Safavi
Attorney, Agent, or Firm—Merchant, Gould, Smith, Edell, Welter & Schmidt

[57] ABSTRACT

The invention relates to a deformable seal element to seal the gap between the edge of an aperture in a building and the tail of a vehicle driven up to the latter, with aprons which are attached at the sides and at the top to a frame attached to the building, the frame being retained by stays invariable in height at the end near the building and reducible in length counter to the action of a return force, and the stays being constructed as horizontally aligned helicoidal springs which support at their ends remote from the building a support device for the aprons.

5 Claims, 7 Drawing Figures

DEFORMABLE SEAL ELEMENT TO SEAL THE GAP BETWEEN AN APERTURE IN A BUILDING AND A VEHICLE DRIVEN UP TO THE LATTER

The invention relates to a deformable seal element according to the pre-characterising clause of claim 1.

Production sheds, warehouses and cold stores generally exhibit relatively large doors, up to which trucks or container vehicles can be driven to load and unload goods. Despite the large-area openings, it is desired to maintain a uniform temperature in the buildings and also to avoid draughts for the personnel employed. For this reason the openings are provided with door seal elements which ensure that, by the counterthrust of the vehicle, its interior is connected as tightly as possible to the storage room, without the possibility of the external air penetrating. Expensive external ramps and canopies can be economised by this means.

These door seal elements also permit the freight to be moved into the building or vice versa without it being exposed to the weather.

Many door seal elements have been known for many years, among which, for example, it is intended by the arrangement according to U.S. Pat. No. 3,638,667 to achieve that the actual door seal element is so highly yielding that damage by the vehicles driven up to it is eliminated. The same aim is intende to be achieved by the device according to German patent No. 2,428,989 defining the generic type.

Whereas it is ensured by the known arrangements that the requisite yielding is obtained in the case of a pressure of the vehicle body at right angles to the plane of the door aperture, all the devices hitherto known have the disadvantages that, in the case of an oblique approach of the vehicle to the door aperture, the stays for the sealing means which generate the yielding break off, that is to say the stays are not movable universally, but only about one axis which is located substantially parallel to the wall in which the door aperture is provided.

The known apparatuses also have the serious disadvantage that, due to the large number of mechanical, hydraulic, pneumatic or other elements which are incorporated, the door sealing means becomes highly complicated and is prone to corrosion, because the door seal element is of course exposed to the open ambient air.

The underlying object of the invention is to produce a door sealing means which on the one hand creates an effective sealing of the interstice or gap between the vehicle and the actual door aperture, but on the other hand is so resilient that damage to the door sealing means cannot occur in the case of stresses which are not aligned directly at right angles to the wall containing the door aperture.

This object, which underlies the invention, is achieved by the teaching of claim 1.

Advantageous further developments are explained in the subordinate claims.

In other words, the proposal according to the invention achieves that a resilient seal element surround the door aperture is produced, which is universally movable, that is to say does not lead to damage to the stays producing the yielding even in the case of oblique stressing by the sides or the rear end of the vehicle. The construction of the door sealing element according to the invention is simple and can therefore be produced at favorable cost, and the helicoidal springs employed according to the invention are relatively immune from corrosion, and can be arranged in a resilient housing without difficulty.

An illustrative example of the invention is explained below with reference to the drawings, in which.

Figure 1:
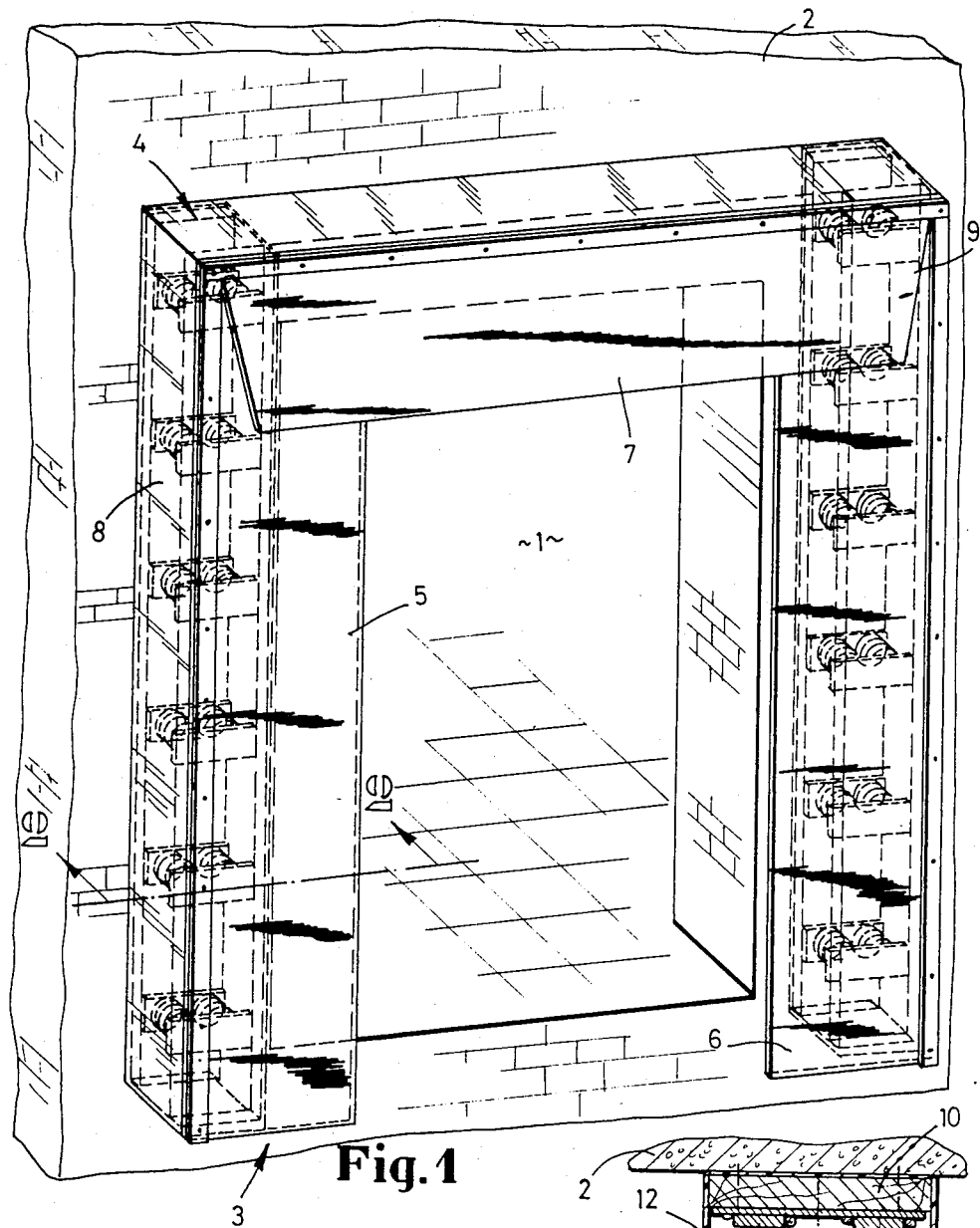
FIG. 1 shows, in perspective, a seal element according to the invention.

In FIG. 1, the reference numeral 1 designates an aperture of a building, which is provided in a wall 2. The actual door sealing means 3 is provided on both sides of the aperture on the building at an interval therefrom, and consists substantially of a frame 4 which has lateral aprons 5 and 6 and a top apron 7, which extend so far into the open space of the building aperture 1 that, when a vehicle 15 is driven up, these aprons 5, 6, 7 contact and seal round the vehicle body and thereby substantially seal the building aperture 1 relative to the external atmosphere.

Figure 2:
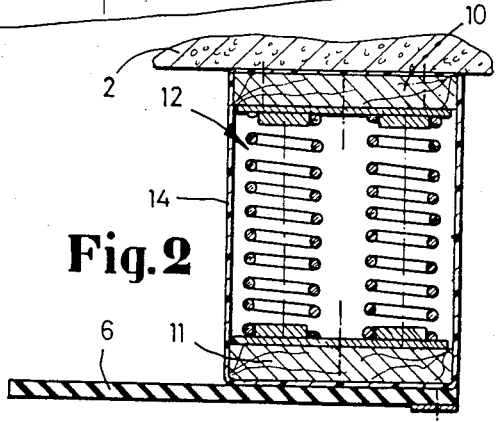
FIG. 2 shows, a section on the line II—II in FIG. 1.

The frame 4 consists of the two frame parts 8 and 9, the construction of which may be seen more clearly from FIG. 2 of the drawing, that is to say, the frame parts 8 and 9 consist substantially of a base plate 10 which is firmly connected to the wall 2, and a support device 11 on which the apron 6 is arranged. The base plate 10 and the support device 11 are arranged at a mutual interval, stays constructed as helicoidal springs 12 being provided within this interval. In this respect—as may be seen more clearly from FIG. 1—in the case of the illustrated example shown, for example—one pair at a time of helicoidal springs 12 is provided, and the two helicoidal springs 12 forming the pair are located juxtaposed in a horizontal plane and a plurality of such pairs of helicoidal springs are arranged superposed in the vertical direction. The arrangement, the number and the strength of the helicoidal springs 12 are governed substantially by the weight of the frame part and by the load which can be imposed in the respective application, particularly by the bending of the aprons 5 and 6.

The helicoidal springs 12 are connected firmly to the wall 2 with interposition of the base plate 10 and support the support devices 11 and therefore the apron 6. The helicoidal springs can yield to a thrust in their spring axis, but are simultaneously also capable of escaping to the side in the case of an oblique approach of the vehicle 15 according to FIGS. 5 to 7, without the possibility of damage occurring.

In the embodiment illustrated in FIG. 1, only two frame parts 8 and 9 are provided, which are not mutually connected by a corresponding frame part in their top region, but it is obviously possible, irrespective of the particular application, to arrange a corresponding frame part equipped with helicoidal springs 12 also in the top region of the building aperture 1.

The space made to accommodate the helicoidal spring 12 between the base plate 10 and the support device 11 is masked by a resilient envelope 14, so that the helicoidal springs 12 are accommodated safe from corrosion within this space, and injuries or the like are also eliminated.

Figure 3:
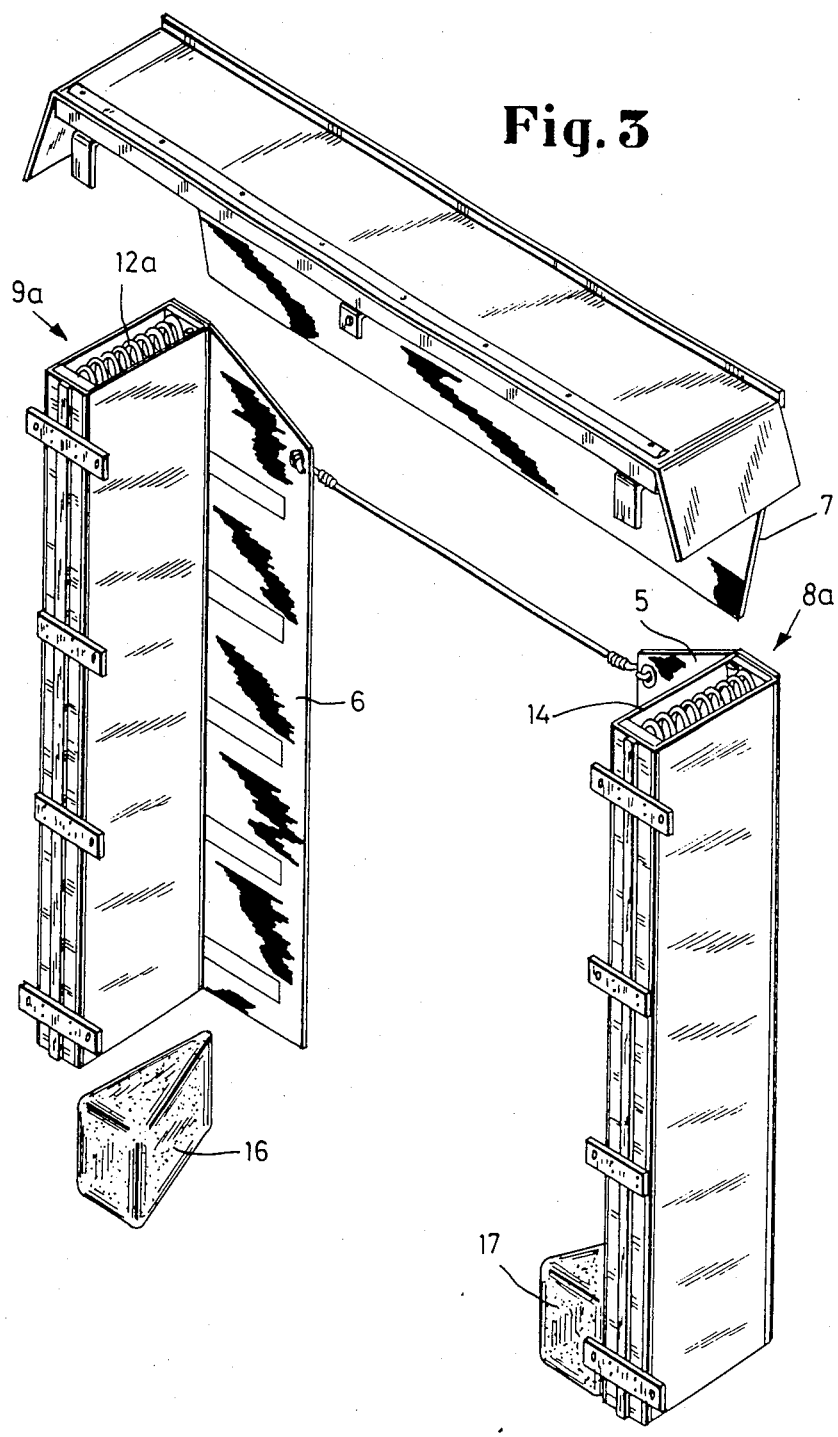
FIG. 3 shows, a modified embodiment of the seal element viewed from its rear side.

In the embodiment illustrated in FIG. 3, frame parts 8a and 9a are provided, in which helicoidal springs 12a are arranged. Whereas in the embodiment according to FIG. 2, two helicoidal springs 12 at a time are arranged juxtaposed in a horizontal plane, in the embodiment according to FIG. 3 only one helicoidal spring at a time is provided in the horizontal plane in each frame part 8a or 9a respectively.

It will also be seen from FIG. 3 of the drawing, how the frame parts 8a and 9a are anchored to the wall 2, which is not shown in FIG. 3.

Corner sealing elements filled with particularly soft foam, which prevent any suction effect, are provided in the lower region of the frame parts 8a and 9a.

Figure 4:
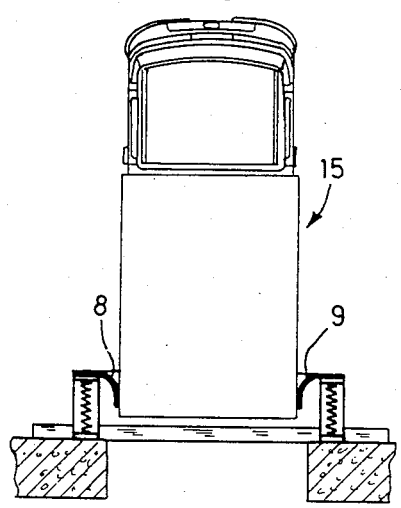
FIGS. 4 to 7 show, various positions of the vehicles in relation to the sealing means.

FIG. 4 shows that a vehicle 15 which is driven up correctly with its reare side to the building aperture 1 causes the aprons 5 and 6 to contact the vehicle body airtightly. By this means draughts and heat losses are prevented and rain, snow and wind can no longer penetrate into the building aperture 1.

Figure 5:
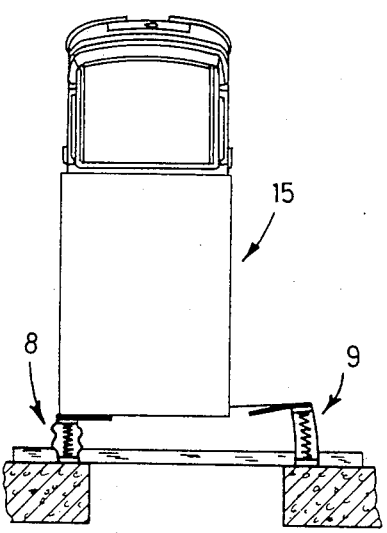

In the case of the position of the vehicle 15 illustrated in FIG. 5, the helicoidal spring 12 is compressed, whereas the opposite helicoidal spring swings inwards, and no damage occurs in the region of the marginal edges of the building aperture.

Figure 6:
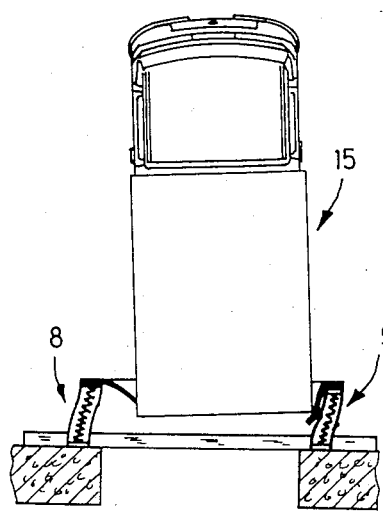

In the illustration in FIG. 6, the helicoidal springs are compressed at the beginning of the approach, but upon further reversing of the vehicle 15 both frame parts 8 and 9 escape to the side.

Figure 7:
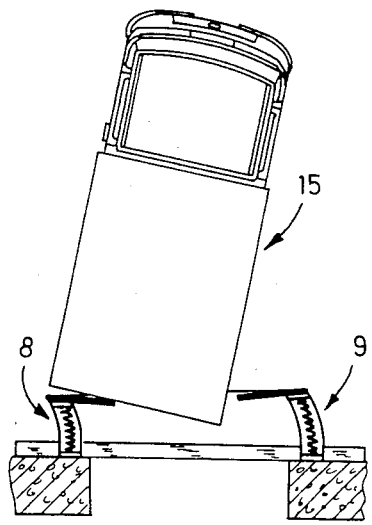

Lastly, FIG. 7 shows that the entire door sealing attachment can swing to the side due to the suspension movable in all directions. The advantageous effect of the apparatus according to the invention will be seen most clearly from FIGS. 4 to 7 of the drawing.

I claim:

1. A deformable seal arrangement for sealing a gap between opposite side edges of an aperture in a building and a tail end of a vehicle driven up to the aperture; said deformable seal arrangement comprising:
   (a) a frame attached to the building; said frame including first and second vertical frame parts, each frame part comprising: a base plate; an associated support device; and, a plurality of stays;
      (i) said first and second frame parts being respectively arranged along opposite side edges of the aperture; said base plate of each frame part being mounted substantially adjacent the building;
      (ii) each of said support devices being mounted spaced from said associated base part and spaced outwardly from said building;
      (iii) said plurality of stays comprising a plurality of helicoidal springs positioned between and attached to each of said base plates and each associated support device to mount each support device on its associated base plate; said helicoidal springs being constructed and arranged to permit biasing of each support device toward said associated base plate; said helicoidal springs further being arranged to permit lateral movement of each support device relative to said associated base plate;
   (b) an apron mechanism supported by said support device and constructed and arranged for providing a sealing engagement with the vehicle.

2. An apparatus according to claim 1 wherein said helicoidal springs (12) are arranged as a plurality of pairs, the individual members of each pair being aligned horizontally with respect to one another.

3. An apparatus according to claim 1, wherein only one helicoidal spring (12a) is provided in each frame part (8a, 9a) in a horizontal plane, but a plurality of helicoidal springs (12a) are arranged superposed in each frame part in the vertical direction.

4. An apparatus according to claim 1 including an upper apron wherein the upper apron (7) is supported by both of said frame parts (8, 9, 8a, 9a).

5. Apparatus according to claim 1 wherein said frame parts formed by said base plates (10), said support devices (11) and said interposed helicoidal springs (12, 12a) are each provided with a resilient outer envelope (14).

* * * * *